US006786966B1

(12) United States Patent
Johnson et al.

(10) Patent No.: US 6,786,966 B1
(45) Date of Patent: Sep. 7, 2004

(54) PULVERULENT ASH COMPOSITION AS A PORTLAND CEMENT SUBSTITUTE FOR IMPROVING CONCRETE PRODUCTS AND METHOD

(76) Inventors: William B. Johnson, 209 Mississippi Dr., Monticello, MN (US) 55362; Michael F. Priesnitz, 6748 215th Ave. NE., Wyoming, MN (US) 55092

(*) Notice: Subject to any disclaimer, the term of this patent is extended or adjusted under 35 U.S.C. 154(b) by 0 days.

(21) Appl. No.: 10/165,223

(22) Filed: Jun. 7, 2002

(51) Int. Cl.[7] .............................................. C04B 7/12
(52) U.S. Cl. ............................ 106/705; 106/DIG. 1; 588/252; 588/256; 588/257
(58) Field of Search ........................ 106/DIG. 1, 705

(56) References Cited

U.S. PATENT DOCUMENTS

| 4,210,457 A | 7/1980 | Dodson et al. |
| 5,266,111 A | 11/1993 | Barbour |
| 5,346,549 A | 9/1994 | Johnson |
| 5,362,319 A | 11/1994 | Johnson |
| 5,374,308 A | 12/1994 | Kirkpatrick |
| 5,430,235 A | 7/1995 | Hooykaas |
| 5,578,122 A | 11/1996 | Carrasquillo |
| 5,928,420 A | 7/1999 | Oates |
| 6,200,379 B1 | 3/2001 | Strabala |

FOREIGN PATENT DOCUMENTS

JP          09075897         * 3/1997

* cited by examiner

Primary Examiner—Paul Marcantoni
(74) Attorney, Agent, or Firm—James V. Harmon

(57) ABSTRACT

A dry pulverulent ash composition is described which comprises a dry pulverulent fly ash to be used as a portland cement substitute for improving the physical properties of a finished concrete product. The ash composition includes fly ash together with an oxidizer present in a dry pulverulent form that is unreacted with the ash and is maintained in an unreacted state during shipment and storage but is capable of reacting with the fly ash upon an addition of water to convert virtually all and preferably over 95% of the sulfur compounds present in the ash to the sulfite form. The oxidizer is present in minor amount from about 0.5% to about 10% by weight of the composition. An aggregate comprising pellets can also be added to the composition together with a minor amount of portland cement and a conditioner e.g., accelerator to form a concrete block product that is up to 10% lighter than a standard concrete block that does not use the present composition and at the same time exhibits improved crushing strength. A method of forming the ash composition is also described.

15 Claims, 2 Drawing Sheets

PULVERULENT ASH COMPOSITION AS A PORTLAND CEMENT SUBSTITUTE FOR IMPROVING CONCRETE PRODUCTS AND METHOD

FIELD OF THE INVENTION

This invention relates to dry pulverulent cementicious compositions containing fly ash and to a method of forming the composition.

BACKGROUND OF THE INVENTION

Over $2 \times 10^5$ tons of concrete are produced annually in the United States. Any cost effective way of improving the strength, especially the compression strength of concrete is valuable commercially particularly in concrete blocks and in buildings, bridges and other structures in which mixing variations or even weather conditions can have an effect on the pozzolanic reaction and hence the performance of the final concrete product. Accordingly, it is a general objective of the present invention to provide a novel pulverulent composition which is chemically stable, can withstand storage, and is low in cost for use as a portland cement substitute that will increase the compression strength of a concrete end product.

Several processes have been developed for producing aggregate from fly ash. For example, Japanese patent 76015532-B describes the production of a lightweight aggregate from papermaking sludge and fly ash, kraft pulp, lime sludge, waste clay or earth. However, the resulting product had to be calcined at about 1100° C., increasing energy requirements and costs.

European patent EP 430 232-A (priority U.S. Ser. No. 443,156) describes ceramic prepared by forming a suspension of clay and water, adding ash and organic matter and dewatering to below 60% by weight, shaping the particles and firing at elevated temperature. The ash, however, is obtained from sewage sludge or paper containing 10% clay and the organic matter is papermill waste or sewage sludge.

Japanese patent 02283678-A describes the production of ceramic products by mixing or kneading silica fines with industrial waste, such as sewage sludge (ash), sludge from water treatment plants, crude refuse incinerated ash, crushed waste soil, fly ash, paper sludge, pulp waste liquid, and sediment from the sea or rivers. The product is molded and fired at an elevated temperature.

These prior products have certain shortcomings. First, they require a fibrous component. Moreover, the energy requirements are substantial due to the need for firing the aggregate in an oven.

U.S. Pat. No. 5,374,308 describes a wet hydraulic cement containing fly ash, about 14%–22% water, boric acid, ground silica and citric acid. By contrast, a major objective of the present invention is to provide a stable dry pulverulent product.

U.S. Pat. No. 5,578,122 describes a method of producing concrete containing fly ash in which gypsum is interground with portland cement for reducing the formation of cracks in a sulfite environment. Significantly, the patent concerns class C fly ash which contains relatively high amounts of calcium mineral matter e.g., 27.3% CaO giving the ash a pozzolanic activity of 92. By contrast, it is an object of the present invention to be able to utilize Class F fly ash that contains little natural calcium oxide mineral but may contain ground limestone and/or quick lime (CaO) in the amount of about 5%. Another method of providing an ash product that resists sulfite damage is described in U.S. Pat. No. 5,928,420 but in that case silica fume is added to Class C fly ash in the amount of about 3%–10% to achieve sulfite resistance.

U.S. Pat. Nos. 6,200,379; 4,210,457; 5,266,111; 5,362,319 (which contain papermill sludge) and U.S. Pat. No. 5,346,549 describe other cementacious products that contain water in which ash is a constituent. Accordingly, there still exists a need for a dry pulverulent ash containing composition as a stable portland cement substitute for improving concrete products and especially the compression strength of concrete products.

In view of these and other shortcomings of the prior art it is an object of the invention to provide a dry pulverulent composition that can be used as a substitute for portland cement to improve the compression strength of concrete products.

Another object of the invention is to provide a pulverulent ash composition of the type described that remains dry, unreacted and stable during shipment and storage.

Another object of the invention is to provide a dry pulverulent ash product that is miscible in all proportions with portland cement, aggregate sand and water to produce an improved concrete product.

Another object of the invention is to provide a dry pulverulent ash composition that can be used in producing concrete products such as concrete blocks, panels and poured concrete which is stronger yet lighter in weight than an otherwise similar concrete product that is made without the use of the invention.

Yet another object of the invention is provide an improved dry pulverulent ash product as a portland cement substitute which is capable of producing concrete products of improved strength although the ash may contain 15% or more sulfur compounds.

It is another object of the invention is to provide a dry pulverulent composition that is inexpensive to produce, is capable of substantially reducing the cost and bulk density of a finished concrete product made therefrom and remains stable during shipment and storage prior to the addition of water and which can be shipped dry in trucks, train cars, in bulk or packaged in paper bags, etc.

Another object is to find a way of maintaining an ash composition in a stable unreacted but potentially chemically reactive state during shipment and storage to thereby assure that the physical properties of the finished concrete are not diminished.

These and other more detailed and specific objects of the invention will be apparent in view of the following specification which illustrates by way of example but a few of the various forms of the present invention that will be apparent to those skilled in the art within the scope of the appended claims.

SUMMARY OF THE INVENTION

The present invention provides an environmentally stable pulverulent ash composition formed from fly ash that is useful as a portland cement substitute for improving concrete products. The dry product of the invention is environmentally stable in the sense that it is virtually unaffected by environmental moisture during shipment and storage and is useful as a building material when mixed with portland cement, water, sand and aggregate to form a concrete product. The invention is particularly useful using Class F fly ash which contains only about 5% calcium mineral matter but is also useful using Class C fly ash. The dry, pulverulent ash composition of the present invention improves the physical properties of concrete that is produced therefrom while at the same time reducing its cost.

To form the composition, the moisture content of fly ash is maintained or reduced to less than 5% and preferably less than 1% by weight. With the ash in a dry state, an oxidizer in a dry pulverulent form is then admixed with the ash. The oxidizer raises the pH somewhat when lime is present in the ash and insolublizes sulfite salts contained in the ash. Optionally the composition of the present invention includes a minor amount of portland cement and/or a conditioner such as an ion exchange resin or accelerator in pulverulent form. The composition is uniformly mixed and dried and/or maintained in a dry condition of less than 5.0% moisture during storage. It was found that in this condition it was stable and could later be used as a replacement for portland cement in making any of a variety of formed products such as blocks, slabs, pellets, agglominates, poured concrete and the like which exhibit a compression strength that is substantially greater than equivalent concrete produced from portland cement without the present ash composition. An improvement in compression strength as great as 17% was obtained (ASTM Test C618).

In distinction to prior products, the present invention maintains the ash and oxidizer together in an unreacted state. It was found that although the oxidizer is uniformly and intimately admixed with the ash, no chemical reaction takes place and the product can be considered stable and capable of being stored indefinitely provided the moisture content is reduced or maintained at or below levels set forth herein. If the moisture content is excessive, the strength of the finished concrete product will be reduced, which is of course undesirable.

DETAILED DESCRIPTION OF THE INVENTION

Figure 1:
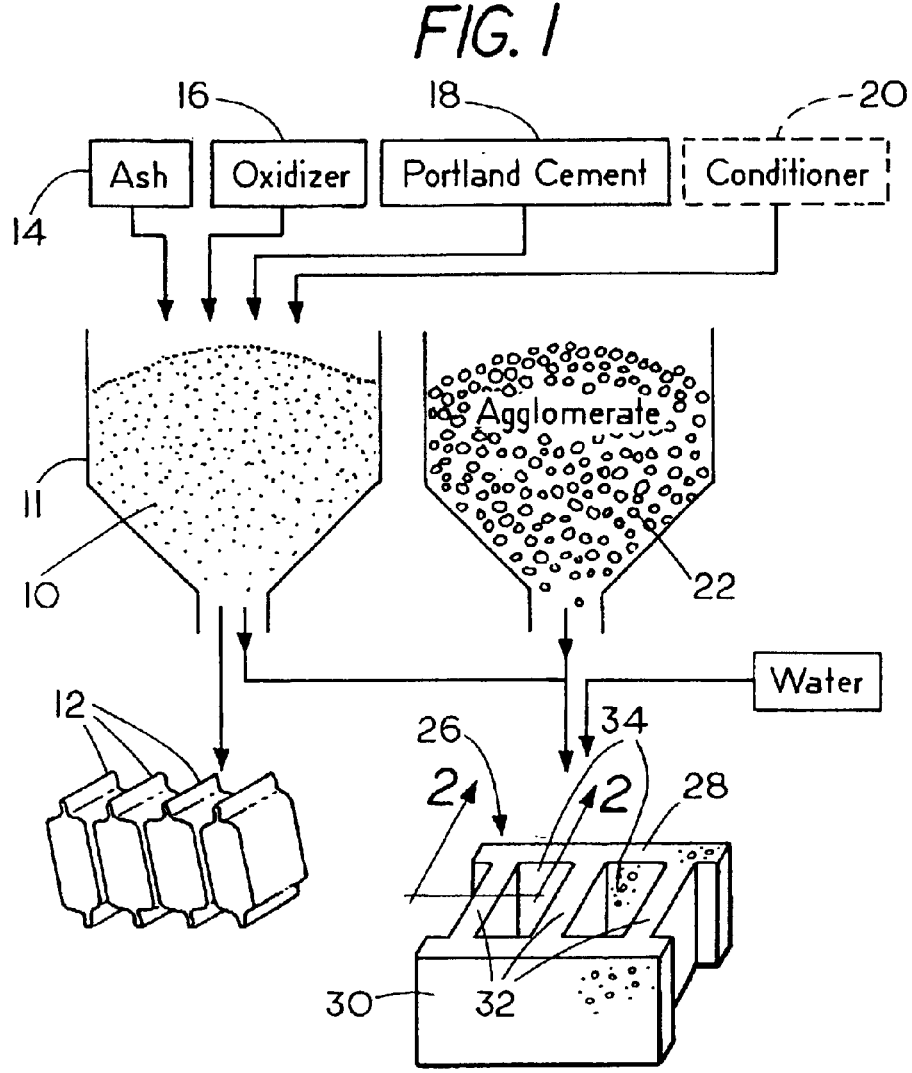
FIG. 1 is a flow diagram showing the production of an ash composition in accordance with the present invention and its use in forming a concrete product.
Figure 2:
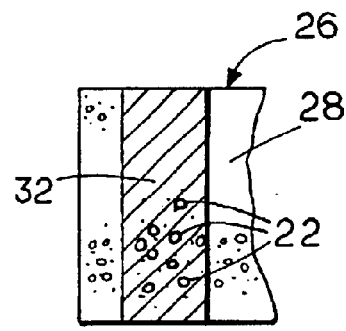
FIG. 2 is a vertical cross-sectional view taken on line 2—2 of FIG. 1 on an enlarged scale and FIG. 3 is a diagrammatic elevational view partly in section showing a plant for preparing compositions in accordance with the invention.

Fly ash is a waste product that is produced in massive amounts particularly in the burning of coal. The invention is concerned with the utilization of fly ash especially Class F fly ash; a very finely divided ash produced by the combustion of antracite and bituminous coal in large industrial coal-fired boilers, especially for the steam generation of electricity. The ash is suspended in the flue gases from such boilers and is separated therefrom by e.g. electrostatic precipitation. This ash product is being generated in enormous quantities in the order of millions of tons per year and is an increasingly serious environmental problem. Thus, there exists an important need for economically effective ways of consuming this material which otherwise accumulates as a waste product.

One useful fly ash sample from burning Western coal had the following analysis: 45% silica ($SiO_2$), 28% alumina ($Al_2O_3$), 5% lime (CaO), 3% ferric oxide ($Fe_2O_3$), 1.4% titania ($TiO_2$) with the balance made up of other trace minerals. Since other ash materials such as Class C fly ash are also useful in the invention, there is no intention to limit the present composition to the foregoing analysis which is presented merely by way of example. The fly ash is a dry, gray-colored hygroscopic powder that may contain trace amounts of heavy metals of which Pb, Hg, Cr, Sr and Cd are the most troublesome. The fly ash also contains moisture. Typically, the fly ash is collected in a stack gas scrubber in which ground limestone and/or quick lime (CaO) is added to the gas. When dissolved in water, CaO is present as calcium hydroxide $Ca(OH)_2$. The amount of CaO added is usually about 0.1 pounds per pound of stack gas solids. Quick lime (CaO) may often make up about 5% of the fly ash. If the fly ash that is being used is modified by the addition of lime to the stack gases, about 0.3 pounds of crushed limestone and about 0.1 pounds of lime (CaO) are usually mixed with about 1.0 pounds of fly ash in the stack gases. The present invention can be used with ordinary fly ash or with fly ash that is modified by the addition of lime in this manner. As the fuel combustion products rise in the stack, the added lime and limestone which mixes with the gas interacts chemically with the stack gas in the presence of water reacting with the sulfur baring compounds to form hyposulfonic acid.

The waste fly ash product is dried or maintained at a moisture content of 5% or less. It is then uniformly admixed with a minor amount of an oxidizing agent. A variety of oxidizing agents can be employed. Examples are sodium nitrite, perborate oxidizers such as sodium perborate ($Na_2BO_4$) in the amount of about 0.1%. Other oxidizers can also be used, such as sodium hypochlorite ($Na_2Cl_2O_7$), calcium hypochlorite ($CACl_2O_7$), sodium percarbonate ($Na_2CO_3H_2O_2$), calcium percarbonate ($CaCO_3H_2O_2$), hydrogen peroxide ($H_2O_2$), calcium peroxide, sodium peroxide, ethylene oxide and propylene oxide, among others.

The oxidizing agent is preferably used in an amount of about 0.01% to about 10% and typically about 0.05% to about 5.0%. The oxidizer when used with the lime that has already been added to the fly ash will raise the pH, typically from an original pH of about 5.0 to a pH with oxidizer and lime present of about 9.5. When lime is contained in the ash used in the present invention, it renders the sulfate anions relatively insoluble. (All quantities herein are expressed as parts or percents by weight.)

Refer now to the figures. FIG. 1 shows the dry pulverulent ash composition 10 in accordance with the invention stored temporarily in a silo 11. To produce the ash composition 10, raw fly ash 14 is admixed with an oxidizer 16 in dry form. If desired a small quantity of portland cement 18 can be added to the oxidizer and introduced simultaneously. Optionally, a conditioner 20 is introduced at the same time and is uniformly admixed with the ash 14. It is important that the ash 14 and oxidizer 16 as well as the optional portland cement 18 and conditioner 20 be maintained in a dry unreacted state while in a storage silo 11. When needed, the dry ash composition 10 is transferred to a storage container such as a tank truck holding up to 25 tons or more or to other containers such as shipping containers indicated diagrammatically at 12 in FIG. 1.

FIG. 1 also shows how the ash composition 10 in accordance with the invention can be admixed with an aggregate 22 and water to form a concrete block 26. The aggregate 22 in this case comprises pellets formed as described in U.S. Pat. No. 5,346,549 or U.S. Pat. No. 5,362,319 which are incorporated herein by reference. The pellets 22 can be used in an amount of about 40%, the remaining 60% being the ash composition 10. All publications and patents are herein incorporated by reference to the same extent as if each individual publication or patent was specifically and individually indicated to be incorporated by reference.

The concrete block 26 includes lateral walls 28 and 30 connected by transverse walls 32 in which the aggregate pellets 22 are uniformly distributed. The invention can be used similarly to form other shaped articles or poured concrete products. The block 26 has unique properties. Besides being stronger and exhibiting a compression strength (after 28 days) of 7500 lbs. per square inch compared to a standard block of about 6380 lbs. per square inch, the weight of the block is about 34 lbs. but can weigh as little as 27 and 28 lbs. if desired compared to about 40 lbs. for a similar block made without the use of the invention. Besides being easier for the shipper to transport and for the mason to carry, a 34-lb. block embodying the invention can be produced at a lower cost and is also stronger. Finished concrete products made from the present composition typically weigh about 10%–40% less than equivalent concrete products made without the use of the invention, cost less to produce and exceed the strength requirements of standard concrete blocks (ASTM Test C90). Accordingly, the invention provides a lighter product which is also stronger.

The composition 10 in accordance with the invention can be used to replace up to about 60% of the portland cement used in concrete and outperforms portland cement as shown in the following table:

TABLE I

| percent by weight of portland cement | Invention | Compression Strength (lbs./sq. in.) ASTM Test C618 |
|---|---|---|
| 100% | 0% | 6380 |
| 70 | 30 | 7500 |
| 60 | 40 | 7320 |
| 40 | 60 | 6830 |

From the Table it can be seen that by replacing 30% of the portland cement which is used in a concrete product, its compression strength is improved by about 17%.

If desired, a variety of conditioners can be used in the composition. Optionally, a metal-binding composition or heavy metal sequestering agent such as an ion exchange resin, e.g., a cation exchange resin or Zeolite clay can also be added. One example is a cation exchange resin known as Zeo-Rex.RTM. from the Permutit Company of Paramus, N.J. While the amount of ion exchange resin used will vary depending upon the heavy metal contaminants and the quantity of metal present, it is typically used in an amount from about 0.01% to about 1.0%. The ion exchange resin becomes more efficient as the atomic number and valent state of cations present increases. Thus, less is required with ions of higher atomic number. It should also be noted that the oxidizer that is added helps raise the metal ions to their highest valence state, assuring efficient action of the ion exchange resin.

Other conditioners can be employed such as any one of a variety of concrete accelerators in order to speed up the pozzolanic reaction. Examples are calcium formate and calcium chloride. The ash tends to retard the set time of portland cement. An accelerator can thus be used to offset retardation if needed. On the other hand when a slower set time is desirable e.g., to prevent heat build up in poured concrete, the invention will have the advantage of reducing or eliminating the need for a retarder. When the invention is employed in the manufacture of concrete blocks such as the block 26, a relatively fast set-up time is desired. The present composition 10 containing about 1%–5% by weight type 3 portland cement and about 1% by weight calcium formate accelerator will set up in about 8 seconds so that the molds can be quickly removed.

Typically, the present invention is used to replace up to about 60% of the portland cement that is normally used in concrete. It can however be used in greater amounts, say, up to 75% or 80% of an admixture with portland cement and still provide surprisingly good physical properties even when formed from a high sulfur Class F fly ash. It was discovered that the oxidizer is remarkably effective in enabling the invention to provide a strong finished concrete product in spite of the high sulfur content of the ash. This is particularly important since high sulfur is a growing percent of power plant output. The high sulfur ash content has heretofore created a barrier to the production of a durable finished product and was an obstacle in achieving good physical properties when sulfur was present in an amount of 5% by weight or more. Surprisingly, the present invention is able to be used in providing a final concrete product with a variety of sulfur compounds (expressed as $SO_3$) comprising 15% or more of the ash composition.

The invention thus provides an ash composition suitable for use in producing concrete products such as blocks and panels that are stronger yet lighter. The invention can also be used to produce a ready-mix product in which a given quantity of the dry ash composition increases the cubic yards of finished material that are produced because the bulk density of the finished product is less than a standard concrete product. Used in the manufacture of ready-mix or poured concrete e.g., floors, walls, etc., the invention is compatible with any suitable known conditioner 20 such as an accelerator, retardant, etc. that is ordinarily used in concrete for controlling the set time which can vary with mix time, temperature and weather conditions including humidity.

A variety of non-reactive fillers can also be used such as bottom ash (which does not contribute to the pozzolanic reaction since bottom ash is essentially non-reactive) in minor amounts.

Figure 3:
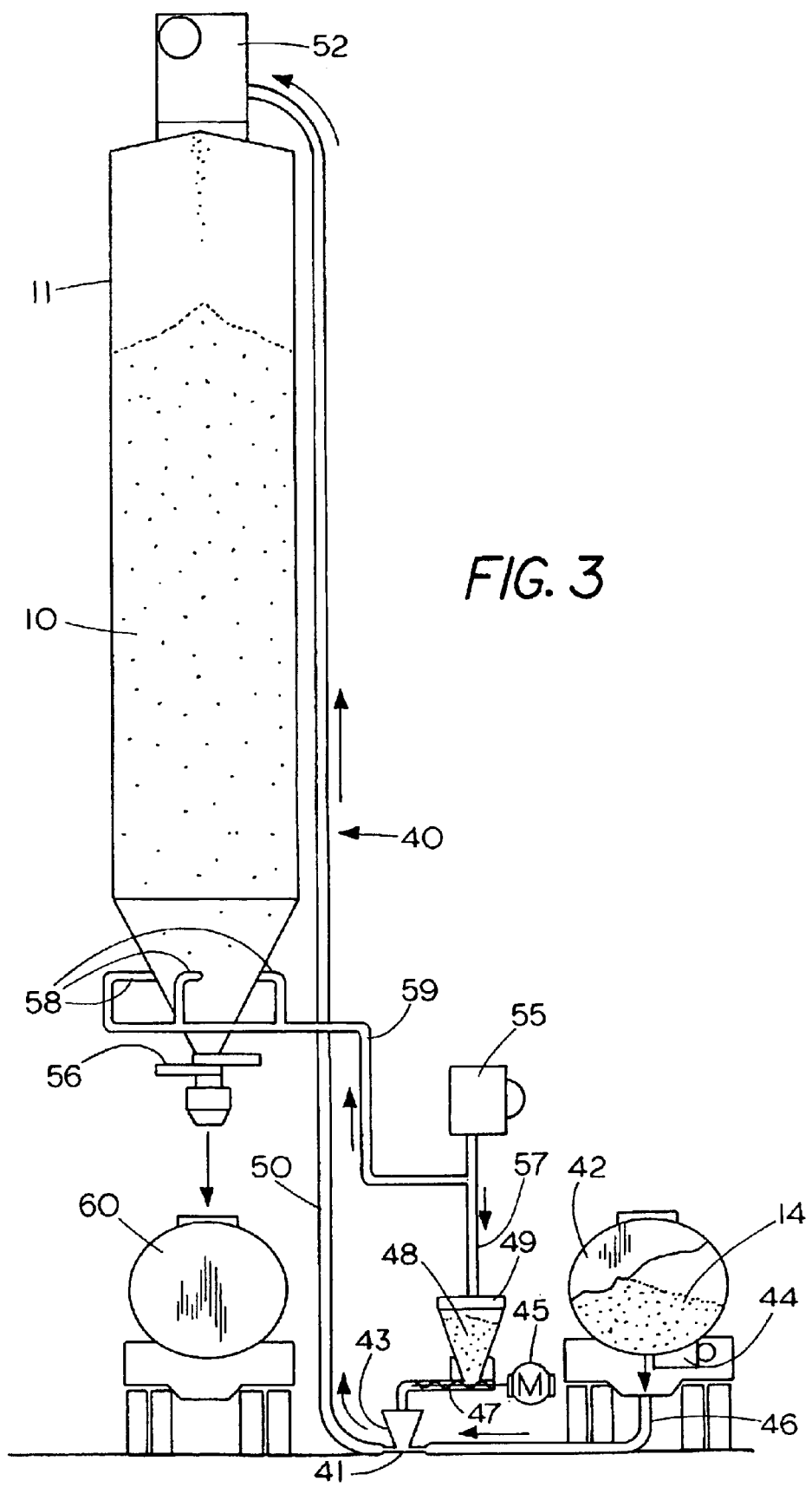

Refer now to FIG. 3 which shows diagramatically a plant for producing the invention. As shown in the figure, Class F fly ash is contained in tanker truck 42 that is pressurized by means of a compressor 44. The ash under pressure is carried away through a flexible pipe 46. The oxidizer 16 and optionally a relatively small amount of portland cement 18 and/or conditioner 20 is mixed together and placed in a pressurized feed hopper 49. From hopper 49 this admixture is accurately metered by means of an auger 47 driven by motor 45 into a funnel-shaped container 43 which communicates at its lower end with a narrow section of pipe that acts as an adductor 41. The adductor 41 and auger 47 accurately meter the oxidizer and other constituents 48 contained in the hopper 49 into a feeder line 50 that carries the uniformly admixed pulverulent ash composition to the top of the silo 11 where the ash composition 10 is temporarily stored. When the ash composition is to be used, the gate valve 56 is opened while fluidizing air is introduced through aeration pipes 58 allowing the finished ash composition to flow downwardly into any suitable temporary storage container such as a tank truck 60 or any other suitable container such as a paper bag, etc. for use as a portland cement substitute in producing a finished concrete product. To maintain the ash composition in a dry state, atmospheric air is pumped from a dryer 55 of any suitable known construction through compressed air lines 57 and 59 to the oxidizer feed hopper 49 and to several radially arranged aeration pipes 58 connected to the base of the silo 11 for fluidizing the ash composition 10 when the gate valve 56 is opened. The dry air supplied by the dryer 55 will prevent moisture from being introduced with the oxidizer so as to keep the oxidizer from reacting prematurely with the ash 14 and will maintain the ash composition in an environmentally stable potentially reactive condition at or below the moisture content of the fly ash so as to preserve its chemical reactivity as well as the strength of the finished concrete product.

When sodium nitrite ($NaNO_2$) is employed as an oxidizer it is preferably used in the amount of about 0.05% to about 10% and most preferably in the amount of about 0.8% to about 1.2% by weight of the fly ash. When portland cement is admixed with the fly ash, it is preferably used in the amount of about 0.5% to about 10.0% by weight. One preferred composition comprises 98.9% Class F fly ash, 1% type 3 portland cement and 0.1% $NaNO_2$. Bottom ash, when used, can be present in amount of up to say 50% by weight as a non-reactive filler.

Many variations of the present invention within the scope of the appended claims will be apparent to those skilled in the art once the principles described herein are understood.

What is claimed is:

1. A pulverulent ash composition as a portland cement substitute for increasing the compression strength of a finished concrete product comprising, a dry pulverulent class F fly ash product formed in the burning of coal, and containing an oxidizer, said oxidizer being unreacted with the ash during storage of the composition, said composition being made by the process of: reducing or maintaining the moisture content of the fly ash at a level of 5% or less by weight, admixing said oxidizer with the fly ash in an amount of about 0.05% to about 10% by weight of the composition for converting sulfur compounds that are present in the fly ash to the sulfate form, maintaining the oxidizer in a dry state of 5% moisture or less by weight by admixing the oxidizer with a stream of air that has passed through a dryer for reducing the moisture content of the air and thereafter admixing the oxidizer with the fly ash, storing the pulverulent ash and oxidizer in such a way as to maintain said ash and oxidizer in a dry unreacted state during storage, whereby a finished concrete product formed later from said ash composition following said storage will have compression strength up to about 10% greater than an equivalent concrete product without said ash composition present therein.

2. The composition of claim 1 wherein the moisture content of the fly ash composition is 0.6% or less by weight.

3. The composition of claim 1 wherein the oxidizer is a dry pulverulent oxidizer comprising at least one member selected from the group consisting of sodium nitrite, sodium perborate, sodium percarbonate, sodium hypochlorite, calcium hypochlorite, calcium percarbonate, hydrogen peroxide, calcium peroxide, sodium peroxide, ethylene oxide and propylene oxide.

4. The composition of claim 1 wherein the ash composition contains heavy metal ions and a pulverulent heavy metal sequestering agent selected from Zeolite or an ion exchange resin is admixed in said composition.

5. The product of claim 1 wherein the moisture content of the ash composition is maintained at 0.6% or less and the oxidizer is present in an amount of from about 0.05% to about 5% by weight.

6. The product of claim 5 wherein the oxidizer is dried by dispersing the oxidizer in dry air to reduce or maintain the moisture content of this oxidizer at or below the moisture content of the fly ash.

7. A method of forming a dry pulverulent ash composition as a portland cement substitute comprising the steps of providing a dry pulverulent fly ash, reducing or maintaining the moisture content of the fly ash at a level of 5% or less, by weight, admixing an oxidizer with fly ash in an amount effective for converting sulfur compounds that are present in the fly ash to the sulfate form, maintaining the oxidizer in a dry state of 5% moisture or less by weight when the oxidizer is admixed with the fly ash, and storing the pulverulent ash and oxidizer as to maintain said ash and oxidizer in a dry unreacted state during storage, such that concrete products formed from said ash composition have a compression strength significantly greater than an equivalent concrete product in which portland cement is used in place of said composition.

8. The method of claim 7 including the step of maintaining the oxidizer in a dry state by admixing the oxidizer with a stream of air that has passed through a dryer for reducing the moisture content of the air such that the oxidizer and fly ash remain in a dry unreacted state during storage.

9. The method of claim 7 whereby including the step of admixing the minor amount of portland cement with the fly ash and oxidizer.

10. The method of claim 7 including the step of admixing a conditioner with said fly ash and oxidizer, said conditioner being at least one member selected from the group consisting of zeolite, an ion exchange resin or an accelerant for reducing the set time of concrete containing said composition.

11. A dry pulverulent ash composition that is sufficiently environmentally stable to be packaged or shipped dry for use as a portland cement substitute that increases the strength of a concrete product formed therefrom, said composition comprising, a dry pulverulent fly ash having a moisture content of 5% or less that is derived from the burning of coal, an oxidizer in the amount of about 0.05% to about 0% by weight admixed therewith, said oxidizer converting sulfur compounds that are present in the ash to the sulfate form to thereby increase the compression strength of a finished concrete product containing said composition, the oxidizer comprising at least one member selected from the group consisting of sodium nitrite, sodium perborate, sodium percarbonate, sodium hypochlorite, calcium hypochlorite, calcium percarbonate, hydrogen peroxide, calcium peroxide, sodium peroxide, ethylene oxide and propylene oxide and, portland cement in pulverulent form admixed therewith, storing the pulverulent ash and oxidizer so as to maintain said ash and oxidizer in the dry unreacted state during storage, such that a finished concrete product formed from said ash composition has a compression strength up to about 10% greater than an equivalent concrete product without said ash composition present therein.

12. A method of forming a dry pulverulent ash composition as a portland cement substitute comprising, providing a dry pulverulent fly ash that is derived from the burning of coal, reducing or maintaining the moisture content of the fly ash at a level of 5% or less, by weight, admixing an oxidizer with fly ash in an amount of about 0.05% to about 10% by weight of the composition for converting sulfur compounds that are present in the fly ash to the sulfate form, maintaining the oxidizer in a dry state of 5% moisture or less by weight when the oxidizer is admixed with the fly ash, by admixing the oxidizer with a stream of air that has passed through a dryer for reducing the moisture content of the air such that the oxidizer and fly ash remain in said dry state so as to be in an unreacted state during storage, admixing a minor amount of portland cement with the fly ash and oxidizer and storing the pulverulent ash and oxidizer so as to maintain said ash and oxidizer in a dry unreacted state during storage.

13. The method of claim 12 including the step of admixing a conditioner with said fly ash and oxidizer, said conditioner comprising at least one member selected from the group consisting of zeolite, an ion exchange resin and an accelerant for reducing the set time of a concrete product containing said composition.

14. The composition of claim 1 wherein following said storage, water is added to the admixture of the fly ash and oxidizer to form said concrete product.

15. The method of claim 7 wherein following said storage, water is added to the admixture of the fly ash and oxidizer to form said concrete product.

* * * * *